(12) United States Patent
Hirota

(10) Patent No.: US 7,918,737 B2
(45) Date of Patent: Apr. 5, 2011

(54) GAME METHOD AND GAME SYSTEM

(75) Inventor: Ryuhei Hirota, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 413 days.

(21) Appl. No.: 11/538,807

(22) Filed: Oct. 5, 2006

(65) Prior Publication Data

US 2007/0087827 A1 Apr. 19, 2007

Related U.S. Application Data

(63) Continuation of application No. PCT/JP2005/006751, filed on Apr. 6, 2005.

(30) Foreign Application Priority Data

Apr. 9, 2004 (JP) .................... 2004-116005

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/42; 463/16; 463/30; 463/40; 700/92; 700/91; 705/14; 380/251

(58) Field of Classification Search .................. None
See application file for complete search history.

(56) References Cited

U.S. PATENT DOCUMENTS

| | | | | |
|---|---|---|---|---|
| 5,083,271 A | * | 1/1992 | Thacher et al. | 700/92 |
| 5,593,349 A | * | 1/1997 | Miguel et al. | 463/30 |
| 5,697,844 A | * | 12/1997 | Von Kohorn | 463/40 |
| 5,746,656 A | * | 5/1998 | Bezick et al. | 463/42 |
| 5,768,382 A | * | 6/1998 | Schneier et al. | 380/251 |
| 5,813,913 A | * | 9/1998 | Berner et al. | 463/40 |
| 5,823,879 A | * | 10/1998 | Goldberg et al. | 463/42 |
| 5,846,132 A | * | 12/1998 | Junkin | 463/42 |

(Continued)

FOREIGN PATENT DOCUMENTS

JP 2001-113050 A 4/2001

(Continued)

OTHER PUBLICATIONS

XP-001082934, Chris Hecker et al.; Dear Reckoning; Game Developer, CMP Media, San Francisco, CA; vol. 8; No. 2; Feb. 2001.

*Primary Examiner* — Paul A. D'Agostino

(74) *Attorney, Agent, or Firm* — Global IP Counselors, LLP

(57) ABSTRACT

A competitive game management system is disclosed which manages a competitive game played by a plurality of players. Take, for example, a league competition played by players A, B, C, and D. Between the player A and the player B, for instance, a home game operated by the player A and an away game in which a CPU acts as the simulated player A are arranged. Similarly, between the player A and each of the other players C and D, two games are arranged respectively. These arrangements are made for all combinations of players, and a league ranking is determined based on all the results of the games. Therefore, a player can play the game against other real players, and the result of the competitive game will be evaluated equally for each player.

14 Claims, 16 Drawing Sheets

U.S. PATENT DOCUMENTS

| | | | |
|---|---|---|---|
| 5,860,862 A * | 1/1999 | Junkin | 463/40 |
| 5,871,398 A * | 2/1999 | Schneier et al. | 463/16 |
| 5,907,831 A * | 5/1999 | Lotvin et al. | 705/14 |
| 5,916,024 A * | 6/1999 | Von Kohorn | 463/40 |
| 5,917,725 A * | 6/1999 | Thacher et al. | 700/91 |
| 6,095,920 A | 8/2000 | Sadahiro | |
| 6,264,560 B1 * | 7/2001 | Goldberg et al. | 463/42 |
| 6,371,855 B1 * | 4/2002 | Gavriloff | 463/42 |
| 6,406,371 B1 | 6/2002 | Baba et al. | |
| 6,758,754 B1 * | 7/2004 | Lavanchy et al. | 463/42 |
| 6,951,516 B1 * | 10/2005 | Eguchi et al. | 463/40 |
| 2004/0157654 A1 | 8/2004 | Kataoka et al. | |
| 2005/0107162 A1 * | 5/2005 | Kilby et al. | 463/42 |

FOREIGN PATENT DOCUMENTS

| | | |
|---|---|---|
| JP | 2001-149658 A | 6/2001 |
| WO | WO-98/14898 | 4/1998 |
| WO | WO-02/42921 A1 | 5/2002 |
| WO | WO-03/088161 A1 | 10/2003 |

* cited by examiner

Short pass rate
Lateral pass rate
Back pass rate
Through pass rate
Centering rate
Clearing rate
Long pass rate
Shot rate
Dribbling shot rate
Direct shot rate
Lob shot rate
Sliding rate
Heading rate
Press rate
Dash rate
Shot cancel rate
Strategy invocation rate
Keeper jump out rate
Feint rate

Fig. 6

Number of short passes
Number of lateral passes
Number of back passes
Number of through passes
Number of centering kicks
Number of clearing kicks
Number of long passes
Number of shots
Number of dribbling shots
Number of direct shots
Number of lob shots
Number of slides
Number of headers
Number of presses
Number of dashes
Number of shots canceled
Number of times strategy is invoked
Number of times keeper Jumped out
Number of feints

| | Time, Beginning ||||||||||||
|---|---|---|---|---|---|---|---|---|---|---|---|---|
| | Points, Lead |||| Points, Tied score |||| Points, Behind ||||
| | Allies nearby || No allies nearby || Allies nearby || No allies nearby || Allies nearby || No allies nearby ||
| | Enemy in the passing course | No enemy in the passing course | Enemy in the passing course | No enemy in the passing course | Enemy in the passing course | No enemy in the passing course | Enemy in the passing course | No enemy in the passing course | Enemy in the passing course | No enemy in the passing course | Enemy in the passing course | No enemy in the passing course |
| Number of short passes | 684 | 384 | 128 | 337 | 614 | 535 | 986 | 886 | 592 | 543 | 996 | 774 |
| Number of lateral passes | 368 | 374 | 700 | 956 | 519 | 729 | 412 | 646 | 655 | 575 | 183 | 506 |
| Number of back passes | 721 | 157 | 323 | 696 | 841 | 557 | 629 | 242 | 591 | 371 | 956 | 300 |
| Number of through passes | 888 | 831 | 667 | 986 | 125 | 320 | 254 | 333 | 373 | 702 | 922 | 979 |
| Number of centering kicks | 847 | 401 | 715 | 654 | 164 | 321 | 369 | 829 | 260 | 704 | 982 | 782 |
| Number of clearing kicks | 500 | 292 | 101 | 154 | 281 | 821 | 191 | 741 | 236 | 545 | 214 | 814 |
| Number of long passes | 557 | 175 | 034 | 312 | 615 | 447 | 452 | 871 | 307 | 758 | 979 | 522 |
| Number of shots | 767 | 738 | 833 | 995 | 113 | 792 | 507 | 644 | 840 | 208 | 515 | 294 |
| Number of dribbling shots | 466 | 196 | 897 | 961 | 515 | 693 | 784 | 436 | 591 | 562 | 672 | 364 |
| Number of direct shots | 204 | 528 | 858 | 716 | 545 | 503 | 956 | 974 | 680 | 947 | 738 | 201 |
| Number of lob shots | 128 | 852 | 597 | 985 | 516 | 049 | 579 | 281 | 509 | 267 | 752 | 141 |
| Number of slides | 427 | 985 | 834 | 501 | 307 | 257 | 887 | 509 | 277 | 143 | 589 | 266 |
| Number of headers | 821 | 964 | 233 | 677 | 583 | 554 | 364 | 763 | 909 | 464 | 925 | 154 |
| Number of presses | 227 | 151 | 740 | 996 | 588 | 395 | 484 | 275 | 574 | 520 | 461 | 232 |
| Number of dashes | 95 | 198 | 500 | 724 | 509 | 625 | 665 | 547 | 693 | 473 | 148 | 577 |
| Number of shots canceled | | 24 | | 909 | 76 | 20 | 8 | | 65 | 628 | 48 | 12 |
| Number of times strategy is invoked | 819 | 500 | 466 | 634 | 441 | 677 | 1000 | 866 | 262 | 393 | 465 | 59 |
| Number of times keeper Jumped out | 38 | 477 | 620 | 348 | 381 | 382 | 893 | 638 | 155 | 109 | 4 | 244 |
| Number of feints | 13 | 10 | 12 | 7 | 0 | 42 | 44 | 48 | 41 | 38 | 18 | 23 |

|   | A team | | B team | | C team | | D team | | Win | Lose | Draw | Goal difference | Points |
|---|---|---|---|---|---|---|---|---|---|---|---|---|---|
|   |   |   | Home | Away | Home | Away | Home | Away |   |   |   |   |   |
| A team |   |   | 563 | Away |   | Away |   | Away |   |   |   |   |   |
|   | Home |   |   | 564 |   |   |   |   |   |   |   |   |   |
| B team | Home | Away |   |   | Home | Away | Home | Away |   |   |   |   |   |
| C team | Home | Away | Home | Away |   |   | Home | Away |   |   |   |   |   |
| D team | Home | Away | Home | Away | Home | Away |   |   |   |   |   |   |   |

*Fig. 9*

| | Goal difference | Points | Rank |
|---|---|---|---|
| A | 1 | 4 | 1 |
| B | −1 | 1 | 4 |
| C | 0 | 3 | 2 |
| D | 0 | 3 | 2 |

| Competitive game ID | Expiration date |
|---|---|
| α | 2004/3/20 |
| β | 2004/3/31 |
| γ | 2004/4/10 |
| ⋮ | ⋮ |

*Fig. 11*

| Competitive game ID | Final result URL | Posting deadline |
|---|---|---|
| ω | result_omega.html | 2004/4/30 |
| λ | result_ramuda.html | 2004/5/1 |
| ⋮ | ⋮ | ⋮ |

*Fig. 12*

|  | A team | | B team | | C team | | D team | | Win | Lose | Draw | Goal difference | Points | Rank |
|---|---|---|---|---|---|---|---|---|---|---|---|---|---|---|
|  | Home | Away | Home | Away | Home | Away | Home | Away | | | | | | |
| A team |  |  | ○ 2–0 | ▲ 1–1 (564) | × 1–2 | × 0–3 | ○ 1–0 | ▲ 0–0 | 2 | 2 | 2 | −1 | 8 | 2 |
| B team | ▲ 1–1 (563) | × 0–2 |  |  | × 0–1 | ▲ 0–0 | ○ 2–1 | ▲ 1–1 | 1 | 2 | 3 | −2 | 6 | 4 |
| C team | ○ 3–0 | ○ 2–1 | ▲ 0–0 | ○ 1–0 |  |  | ▲ 1–1 | × 0–3 | 3 | 1 | 2 | 2 | 11 | 1 |
| D team | ▲ 0–0 | × 0–1 | ▲ 1–1 | × 1–2 | ○ 3–0 | ▲ 1–1 |  |  | 1 | 2 | 3 | 1 | 6 | 3 |

Fig. 13

| | A team | | B team | | C team | | D team | | Win | Lose | Draw | Goal difference | Points | Rank |
|---|---|---|---|---|---|---|---|---|---|---|---|---|---|---|
| | | | Home | Away | Home | Away | Home | Away | | | | | | |
| A team | | | ○ 2-0 | ▲ 1-1 | × 1-2 | | ○ 1-0 | | 2 | 1 | 1 | 2 | 7 | 1 |
| B team | Home 1-1 ▲ | Away × 0-2 | | | Home | Away ▲ 0-0 | Home | Away | 0 | 1 | 2 | -2 | 2 | 4 |
| C team | Home ○ 2-1 | Away | Home ▲ 0-0 | Away | | | Home | Away × 0-3 | 1 | 1 | 1 | -2 | 4 | 2 |
| D team | Home × 0-1 | Away | Home | Away | Home ○ 3-0 | Away | | | 1 | 1 | 0 | 2 | 0 | 3 |

Fig. 14

GAME METHOD AND GAME SYSTEM

CROSS-REFERENCE TO RELATED APPLICATIONS

This application is a continuation of International Application No. PCT/JP2005/006751 filed on Apr. 6, 2005, which in turn claims priority to Japan Patent Application No. 2004-116005 filed on Apr. 9, 2004. The entire disclosures of International Application No. PCT/JP2005/006751 and Japan Patent Application No. 2004-116005 are hereby incorporated herein by reference.

BACKGROUND OF THE INVENTION

1. Field of the Invention

This invention generally relates to a game method and game system in which players separated by geography can play games against one another.

2. Background Information

Game systems have been proposed previously in which players separated by geography play games against one another. For example, there exists a game system in which a plurality of game terminals in a location are connected so that each of the players can play a competitive game against one another. There also exists a game system in which game terminals in a plurality of locations are connected via the internet or other networks so that players at game terminals in different locations are able to play online games against one another. These game systems are structured such that the game terminals and the server of a game company are connected via one or more networks. In a conventional mah-jongg game, for example, a game terminal transmits an entry request to the server. The server retains a list of terminals requesting entry in real time, and determines a combination of terminals to compete in a game based on all entry requests. The combination is determined based on a rank indicating the degree of proficiency of the players. The server sends the network addresses of the terminals at which the players who will compete in a game are located to the game terminal. The game terminal executes a mah-jongg game by transmitting and receiving game data necessary in order to proceed with the game to/from the network addresses received.

DISCLOSURE OF THE INVENTION

In competitive games played by players separated by geography, a time lag in data communication among the game terminals can occur due to problems with the internet or other network lines. Because of that, it is difficult to reflect the operations of each player at the game terminals of the opponents in real time. One option is to set the game speed of each game terminal in consideration of the time lag in data communication. However, this may damage the sense of reality in the game.

In addition, when the competitive game is played via networks, one of the game terminals involved in the game generally becomes a master, and the others generally become slaves. The master terminal will receive the operations input at the slave terminals, and manage the progress of the game based on the operations received from the slave terminals and operations input in the master terminal. The slave terminals will receive screen display data from the master terminal and output it on their screens. Because the quantity of operation data transmitted to the master terminal is not very large, the time lag for data transmission and reception is usually not a problem. However, because the quantity of display data transmitted to the slave terminals is large, the time lag for data transmission and reception can be a problem, depending on network status such as network traffic, communication band, and communication speed. Consequently, the display timing at the slave terminals will be later than the display timing at the master terminal. In other words, the player at the master terminal has an advantage over the other players at the slave terminals when playing a game.

In view of the above, the competitive games played by players at game terminals separated by geography are limited to those such as mah-jongg or shogi (Japanese chess game), which do not require real-time reflection of the operations executed by a player at the game terminal of an opponent. In games such as a sport simulation game, a racing game, or a competitive fighting game, which require real-time reflection of operations executed by a player at the game terminal of an opponent, or which require a large amount of data to be transmitted, it will be difficult to achieve these online games without the players losing the sense of reality when playing the games. Therefore, it will be difficult for players playing games that require real-time reflection to find real opponents.

In view of the above, it will be apparent to those skilled in the art from this disclosure that there exists a need for an improved game method and game system that will allow a player to designate real players at remote locations and play a competitive game regardless of the type of game, and allow players to participate in an online game equally.

SUMMARY OF THE INVENTION

A first aspect of the present invention provides a competitive game result management system comprising a first game device operated by a first player, a second game device operated by a second player, and a competitive game result management device configured to manage the results of a competitive game played by the first and the second players.

A first game device comprises a first obtaining unit and a first simulated competitive game unit. The first obtaining unit is configured to obtain game data of the second player from the competitive game result management device. The first simulated competitive game unit is configured to play a first simulated competitive game against the first player as a simulated second player based on the game data obtained by the first obtaining unit. The second game device comprises a second obtaining unit and a second simulated competitive game unit. The second obtaining unit is configured to obtain game data of the first player from the competitive game result management device. The second simulated competitive game unit is configured to play a second simulated competitive game against the second player as a simulated first player based on the game data obtained by the second obtaining unit.

The competitive game result management device comprises the following units:
- a player information storing unit configured to store the game data of the first player and the game data of the second player;
- first game data transmission unit configured to transmit the game data of the second player stored in the player information storing unit to the first game device operated by the first player;
- a second game data transmission unit configured to transmit the game data of the first player stored in the player information storing unit to the second game device operated by the second player;
- a first competitive game result receiving unit configured to receive the result of the first simulated competitive game from the first game device;

a second competitive game result receiving unit configured to receive the result of the second simulated competitive game from the second game device; and a game outcome determination unit configured to determine the outcome between the first player and the second player based on the result of the first simulated competitive game received by the first competitive game result receiving unit, and the result of the second simulated competitive game received by the second competitive game result receiving unit.

The present invention is applicable to all competitive games such as a soccer game, a bowling game, a battle game, a mah-jongg game, a go game, and a horse racing game. Take a soccer game as an example. The competitive game result management device (player information storing unit) is connected to the first game device and the second game device via a network, and stores game data of the first player operating the first game device and game data of the second player operating the second game device. The game data may include, for example, the name of a team, the names of team members, and history data indicating the player's habits. There are two kinds of competitive games, which are a home game and an away game.

When the competitive game is a home game for the first player, for example, it is an away game for the second player. In this case, the game is executed at the first game device. The team members of the first player are operated by the first player. In addition, the team members of the second player are operated by the CPU of the first game device. Therefore, in the game which is a home game for the first player and an away game for the second player, the first game device plays a simulated competitive game against the first player operating the first game device on behalf of the second player.

In contrast, when the game is an away game for the first player, it is a home game for the second player. In this case, the game is executed at the second game device. The team members of the first player are operated by the CPU of the second game device. In addition, the team members of the second player are operated by the second player. Therefore, in the game which is an away game for the first player and a home game for the second player, the second game device plays the simulated competitive game against the second player operating the second game device on behalf of the first player.

The competitive game result management device (game outcome determination unit) determines the game outcome between the first player and the second player based on both the result of the home game for the first player and the away game for the second player, and the result of the game in the reverse case. Therefore, the game outcome can be provided under equal conditions for both players. By doing so, an indirect online game can be played even if a player can not directly play an online game against another person. In addition, the game outcome between the players can be determined equally, while the players are given the illusion that they are playing an online game directly.

A second aspect of the present invention provides a competitive game result management system according to the first aspect, wherein the game data stored by the player information storing unit comprises an identifier configured to identify each of a plurality of game characters operated by each player.

In a soccer game or a basketball game, for example, each player plays the game by operating team members on his/her own team. In this case, the game data may include the name, capabilities, condition, and the like of each member.

A third aspect of the present invention provides the competitive game result management system according to the first and second aspects, wherein the game data stored by the player information storing unit includes operation history information on each player who is playing the game.

In a soccer game, the player operation history information may include the number of actions performed, such as a shot pass, a back pass, and a shot, and the selection rate of each action. In a battle game, the types of actions which the player can use are determined in advance, and the number of times that each action is used and the selection rate can be stored as the operation history information. By including the above-indicated data into the game data, the game which is played by each game device on behalf of a player can become closer to a game played by the player him/herself. Accordingly, an indirect competitive game via a network can become closer to a direct competitive game via a network.

A fourth aspect of the present invention provides the competitive game result management system according to the first through third aspects, further comprising at least one game device operated by a player in addition to the first game device and the second game device. The competitive game result management device further comprises a competitive game schedule creation unit configured to create a competitive game schedule that is composed of a combination of three or more players.

In this case, the competitive game result management device receives the results of first and second simulated competitive games for respective competitive games defined by the competitive game schedule. By determining the ranking of the players in the competitive game based on these results, equality among respective players is guaranteed.

A fifth aspect of the present invention provides the competitive game result management system according to the fourth aspect, wherein the competitive game schedule created by the competitive game schedule creation unit defines a round robin league of the selected players.

When three or more players are selected, each of them is allowed to play the first and second simulated competitive games in a league game. By determining the game outcome among the players based on the results of the first and second simulated competitive games, the ranking of the players can be determined equally based on the overall outcomes among respective players.

A sixth aspect of the present invention provides the competitive game result management system according to the fourth aspect, wherein the competitive game schedule created by the competitive game schedule creation unit defines a tournament competition of the selected players.

When three or more players are selected, each of them is allowed to play the first and second competitive games in a tournament game. The outcome among the players is determined based on the results of the first and the second competitive games, and a player who can advance to the next game is determined based on these results. By repeating these processes, the ranking of the players can be determined equally.

A seventh aspect of the present invention provides the competitive game result management system according to any of the first through sixth aspects, wherein the game outcome determination unit sets a predetermined period within which the game outcome between the first player and the second player is determined, and the game outcome determination unit determines the game outcome based on the result of the first simulated competitive game or the result of the second simulated competitive game if the game outcome determination unit does not receive one of either of the results within the predetermined period.

For example, when only the result of the first simulated competitive game can be obtained within the predetermined period, the competitive result management device may determine the game outcome between the first player and the second player based on only this result. This prevents the determination process of the game outcome from taking too long to complete.

An eighth aspect of the present invention provides the competitive game result management system according to any of the first through seventh aspects, wherein the game outcome determination unit sets a predetermined period within which the game outcome between the first player and the second player is determined. This system further comprises a competitive game promoting unit configured to promote execution of a simulated competitive game by transmitting a competitive game promoting notification to the first game device and/or the second game device.

When the game device is a home computer or a home game device, it is possible to transmit the competitive game promoting notification to the game device. By transmitting the competitive game promoting notification to the game device, it is possible to prompt the players to end all competitive games before the competition period elapses.

A ninth aspect of the present invention provides a competitive game result management program which causes a computer to act as the competitive game result management device in the competitive game result management system according to the first aspect. A tenth aspect of the present invention provides a competitive game result management method executed by a competitive game management system according to the first aspect. The ninth and tenth aspects have similar functions and effects as the first aspect.

The present invention allows a player to play an indirect competitive game via a network even if he/she has difficulty playing a direct game against a real opponent. In addition, even in a game which requires speed, the present invention is still able to provide a player with abundant real opponents. Furthermore, the present invention can determine the game outcome of players equally, giving them the illusion that they are playing the competitive game against real players via a network.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

FIG. 6 is an example of the items in the operation tendency information.

FIG. 7 is an example of the items in the operation history information.

FIG. 8 is an example of the number of actions (operation history information) counted in a variety of situations.

FIG. 9 is a conceptual explanatory diagram of a league schedule created by the server.

FIG. 11 is a conceptual explanatory diagram of a list of pending games created by the server.

FIG. 12 is a conceptual explanatory diagram of a list of completed games created by the server.

FIG. 13 is a conceptual explanatory diagram of a league schedule in which all competitive games end within an expiration date.

FIG. 14 is a conceptual explanatory diagram of a league schedule in which all competitive games did not end within an expiration date.

DETAILED DESCRIPTION OF THE PREFERRED EMBODIMENTS

Embodiment 1

Configuration
(1) Overall Configuration

Figure 1:
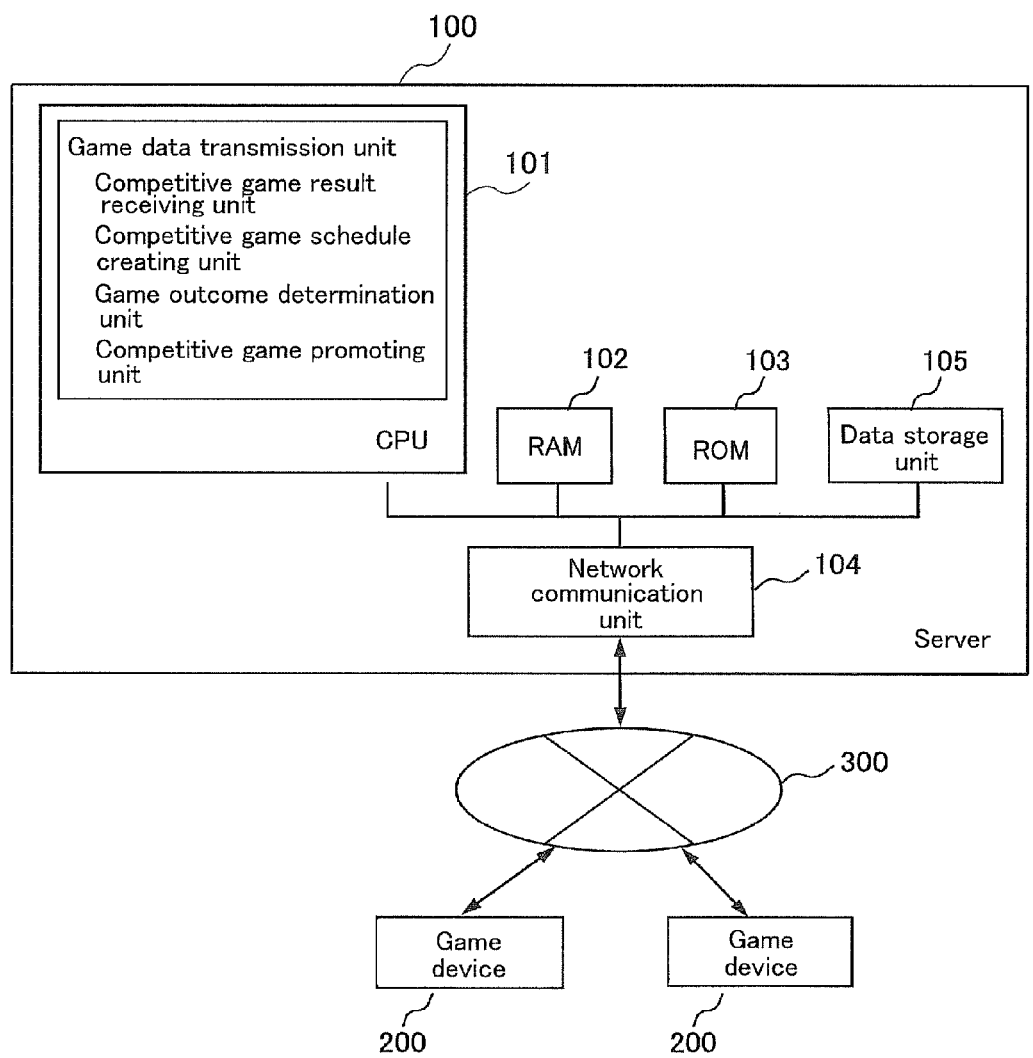
FIG. 1 is an illustrative diagram showing the schematic configuration of a game system according to the present invention.

FIG. 1 shows the configuration of a game system according to Embodiment 1 of the present invention. The game system comprises a server 100 and a plurality of game terminals 200a, 200b . . . which are connected via a network 300 such as the internet. The server 100 and the game terminals 200 are computer systems having a CPU, RAM, ROM, network interfaces, and the like.

(2) Server

The server 100 comprises the following elements (a) through (e).

(a) CPU 101: By running various programs, the CPU 101 causes a computer system to function as a game data transmission unit, a competitive game result receiving unit, a competitive game schedule creation unit (corresponding to a competitive game schedule creation unit and a period setting unit), a game outcome determination unit, and a competitive game promoting unit.

(b) RAM 102: Temporarily stores a variety of variables, parameters and the like.

(c) ROM 103: Stores a control program, predetermined parameters, and the like.

(d) Network communication unit 104: Transmits and receives data to and from the terminal device 200 via the network 300.

(e) Data storage unit 105: Stores player data transmitted from game terminals 200 for each player (corresponding to the player information storing unit). The player data may include game data, operation tendency information, and personal data. The game data is needed to execute a game on behalf of a player. The operation tendency information indicates each player's operating habits. The personal data includes a name, e-mail address and the like of a player. The player data will be explained in detail later.

(3) Game Terminals

Figure 2:
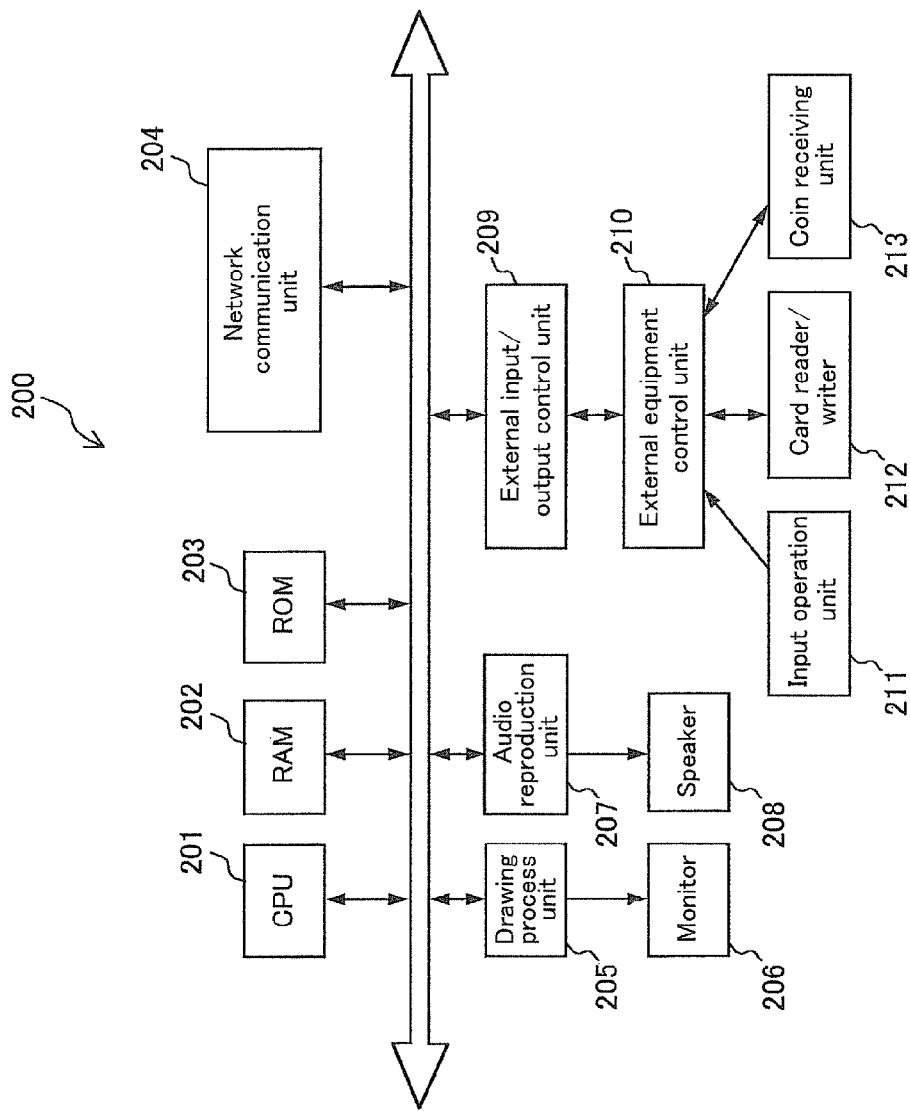
FIG. 2 is a block diagram showing the control of a game terminal.

FIG. 2 shows the configuration of a game terminal 200. The game terminal 200 comprises the following elements (a) through (m).

(a) CPU 201: Runs a variety of programs.

(b) RAM 202: Temporarily stores a variety of variables, parameters, and the like.

(c) ROM 203: Stores a control program, predetermined parameters, and the like.

(d) Network communication unit 204: Transmits and receives data to and from the other terminals via a network.

(e) Monitor 206: Displays graphical content of a game on the game terminal.

(f) Drawing process unit 205: Generates data on the graphical content to be displayed on the monitor 206.

(g) Speaker 208: Outputs sound while game is being played or while a demonstration screen is being displayed.

(h) Audio reproduction unit 207: Generates sound data to be output by the speaker 208.

(i) Input operation unit 211: Comprises a joystick, operation buttons, and the like, and receives operation input from the players.

(j) Card reader/writer 212: Performs a data read/write process on a magnetic card that is inserted therein.

(k) Coin acceptance unit 213: Accepts coins that are inserted therein by a player.

(l) External equipment control unit 210: Controls external equipment such as an operation unit, the card reader/writer 212, the coin acceptance unit 213, and the like.

(m) External input/output control unit 209: Generates control signals to external equipment such as the card reader/writer 212, the coin acceptance unit 213, and the like, and in addition, receives detection signals from the external equipment and sends the signals to the CPU 201.

Example of the Game System (1) Overview of the Game System

Figure 3:
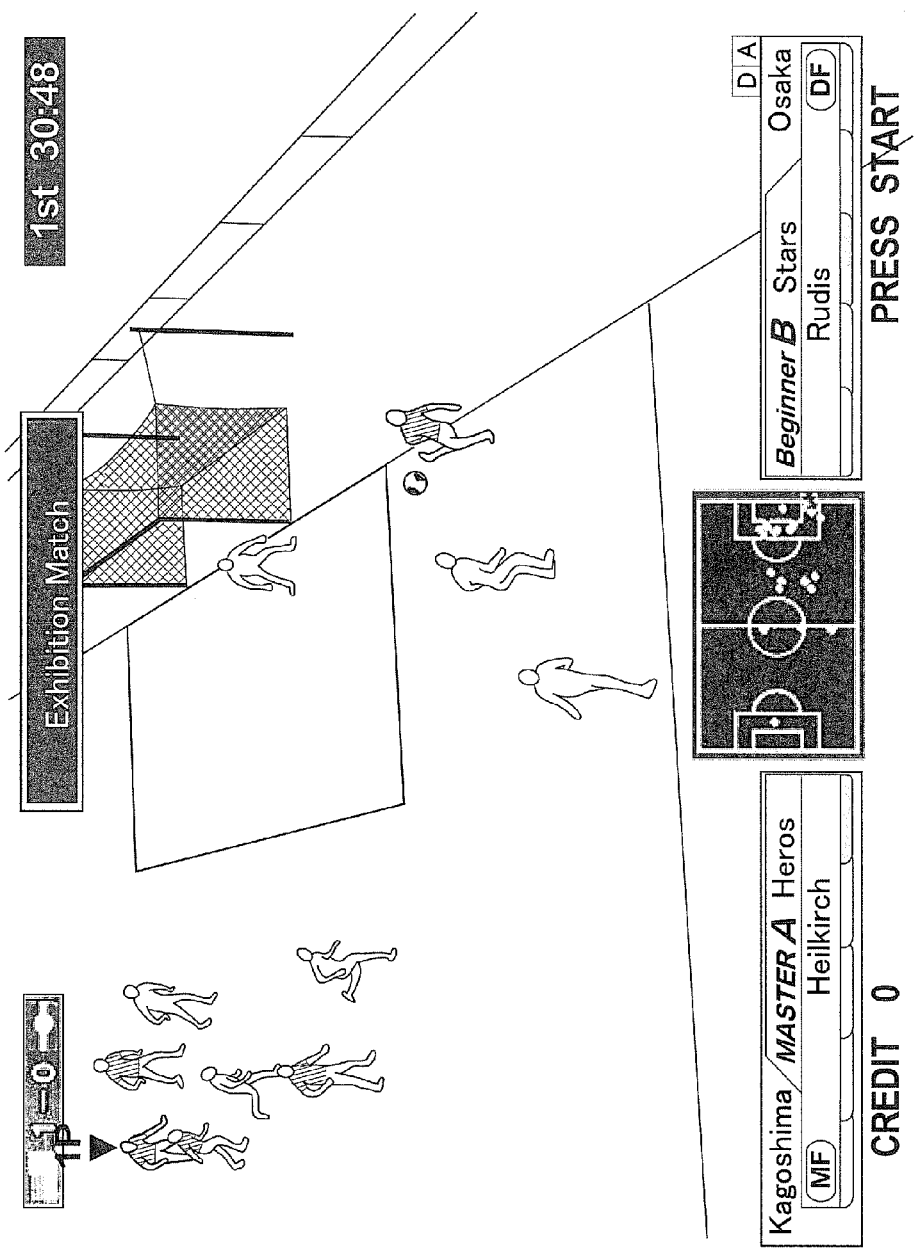
FIG. 3 is an example of a screen displayed in a soccer game to which the present invention is applied.

Next, an example of the game system of the present embodiment applied to a soccer game will be specifically explained with reference to the drawings. FIG. 3 is an example of a screen displayed at the terminal device 200. In this game system, a simulated online game is played between a player and the CPU at the terminal device 200, and the game outcome between the players is determined by the server 100. The game outcome between a player A operating the game terminal 200a and a player B operating the game terminal 200b is determined based on the results of two competitive games. One is played at the game terminal 200a. In this competitive game, game characters on player A's team are operated by player A himself/herself, and game characters on player B's team are operated by the CPU of the game terminal 200a. This competitive game is a home game for the player A, whereas it is an away game for the player B. The other game is a competitive game played at the game terminal 200b. In this competitive game, the game characters on player B's team are operated by player B himself/herself, and the game characters player A's team are operated by the CPU of the game terminal 200b. This competitive game is a home game for the player B, whereas it is an away game for the player A. In short, both of the players will play a home game and an away game respectively.

Figure 4:
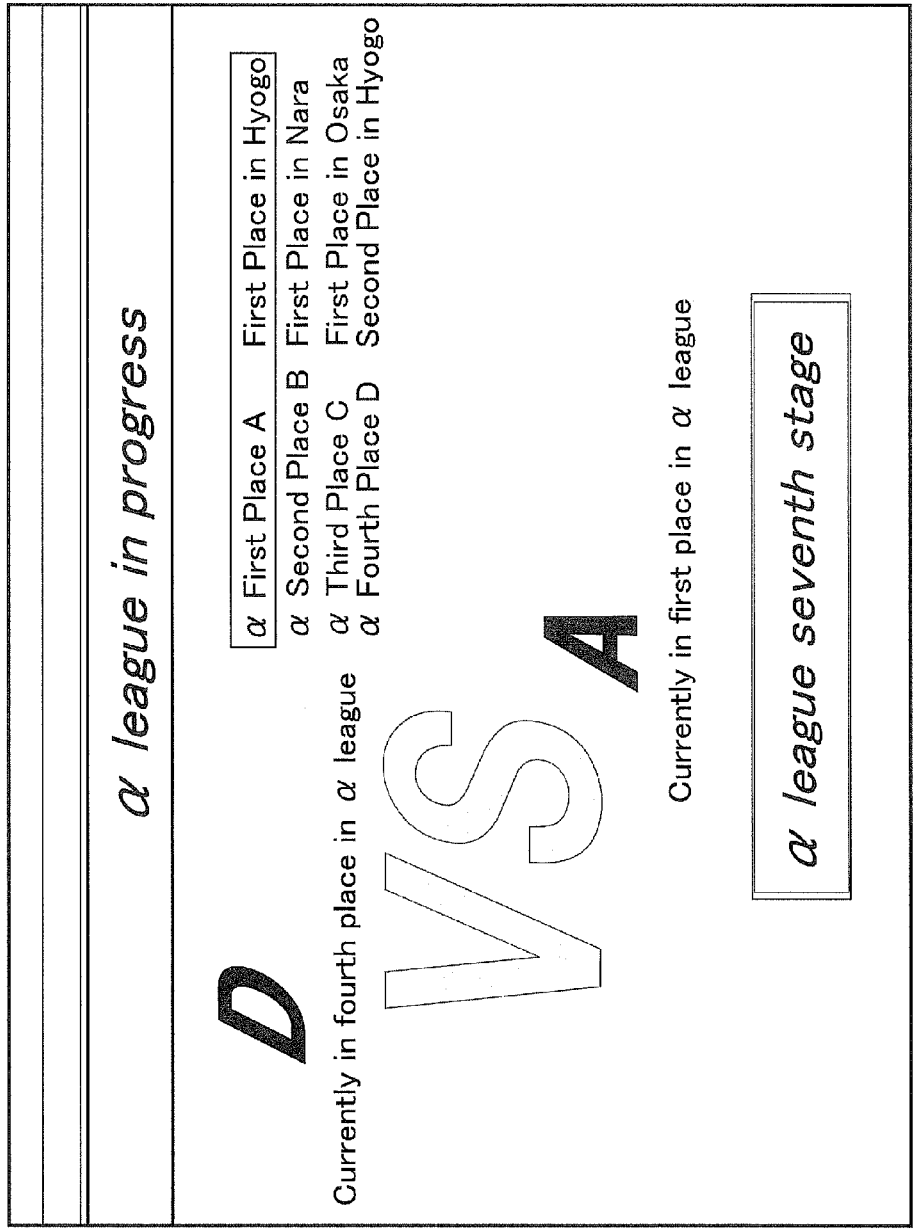
FIG. 4 is an example of a screen showing four players playing a league game and competing for ranking.

The server 100 determines the game outcome between player A and player B based on the results of the two competitive games played by them. Accordingly, the server 100 can determine the game outcome under equal conditions for both player A and player B. The server 100 may set a limitation on the competition period and notify the players about this period. If the competition period ends and only the result of one of the games can be obtained, the server 100 may determine the game outcome based only on the obtained result. Furthermore, the server 100 may transmit a notification to the players to urge the players to proceed with the competitive game before the competition period expires. When three or more players play the competitive game against each another, the server 100 is also able to create a competitive game schedule in a round robin league game or in a tournament game so that the players can play the competitive game based on the competitive game schedule. FIG. 4 is an example of a screen showing that four players play a league game and compete for ranking. Every time the server 100 receives the result of the competitive game from the game terminal 200, the server 100 can update the league schedule and notify the game terminals 200 of the players' ranking.

The CPU of the game terminal 200 performs two processes. As the first process (hereinafter referred to as normal game process), it will accept operation inputs from a player and execute the game in accordance with the operation inputs. As the second process (hereinafter referred to as simulated battle participation process), it will operate the game characters based on the opponent's player data. In the above-described game played by the player A and the player B, when the game is a home game for the player A, the game terminal 200a obtains the player data for player B from the server 100, and operates the game characters on player B's team based on that data. The player data includes operation tendency information, described below, that indicates the operating habits of each player. The CPU of the game terminal 200 determines the actions of each member of player B's team based on the operation tendency information. This provides the player A with the impression that he/she is playing the game against the player B, because the result of an operation performed by the game terminal 200 is similar to that performed by the player B himself/herself.

(2) Server

The function of the server 100 will be explained below more specifically.

(2-1) Player Data

Figure 5:
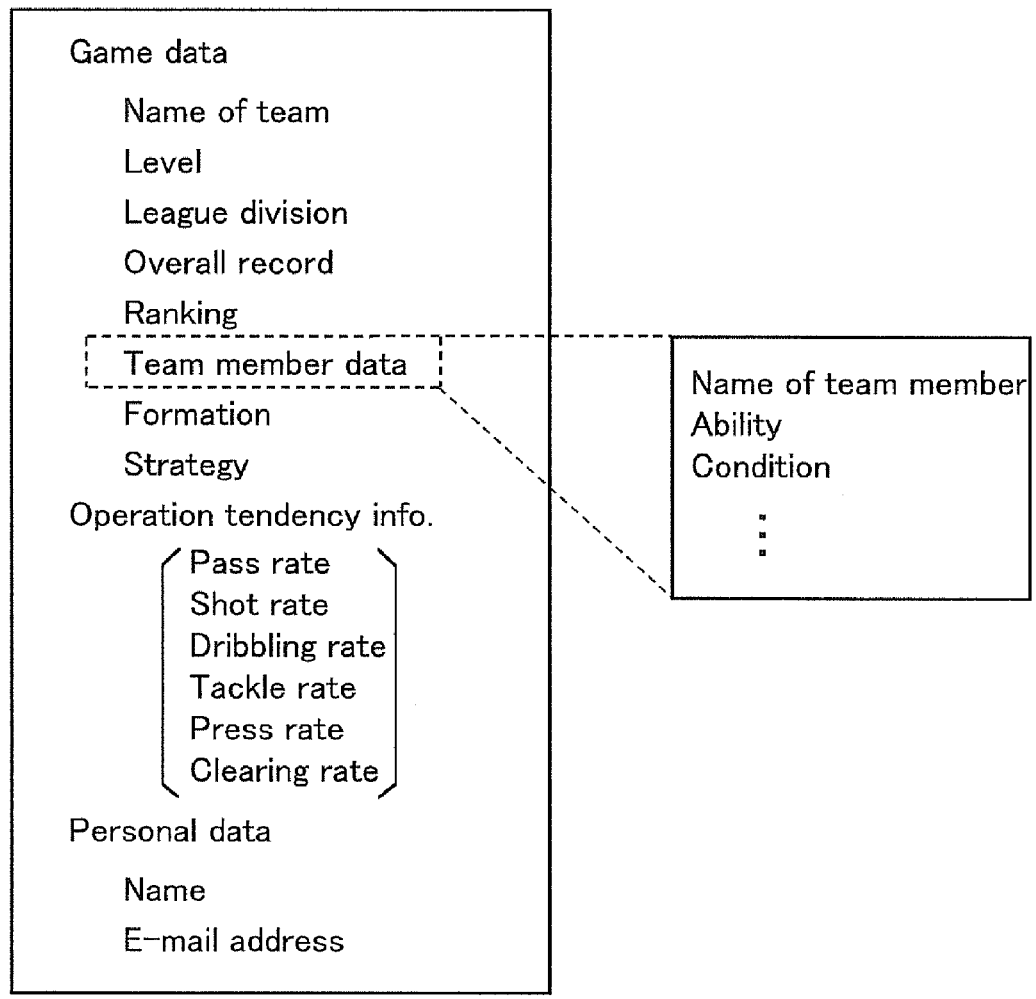
FIG. 5 is an example of the items in the player data.

FIG. 5 shows an example of the items included in player data stored in the data storage unit 105 (corresponding to the player information storing unit) of the server 100. In this example, the player data includes game data, operation tendency information, and personal data. The player data is stored in association with the player ID.

Game Data

Game data is required to execute a game, and differs depending on the type of game. Here, in the example of a soccer game, information such as the name of the team, level, league division, overall record, rank, team member data, formation, and strategy is used as the game data. The team member data includes the name, ability, condition, and the like of each team member belonging to the team.

Personal Data

The personal data includes the name and network address of the player in this example. The network address, such as an e-mail address, is used to transmit the competitive game promotion notification and/or the final result of the league game from the server 100 directly to the player.

Operation Tendency Information

The operation tendency information indicates the operating habits of the player. The operation tendency information is created in the server 100 so that the CPU of the game terminal 200 can pretend to be an opponent in order to play a simulated online game against the player. FIG. 6 shows a more detailed example of the items included in the operation tendency information. The operation tendency information shows the selection rates of predetermined actions in this example. The operation tendency information is calculated based on operation history information, which is the operation inputs of the player.

FIG. 7 shows an example of the items in the operation history information, which is used to calculate the operation tendency information. In this example, the number of times that the predetermined actions are executed is used in the operation history information. FIG. 8 is an example of the operation history information in which the actions are totaled with respect to each situation. The server 100 computes the selection rates for the actions with respect to each situation based on the total number of actions for each predetermined situation, and calculates the operation tendency information. The selection rate of the actions for each situation is calculated by using the formula: (the number of actions in each situation/the total number of actions in each situation)× 100%.

The server 100 may calculate the operation tendency information based on all games played by each player. In addition, it may calculate the operation tendency information based on some of the latest games, or the latest five games, that each player played. Of course, it may calculate the operation tendency information based on only the latest game played by each player. When the past operation history information of a player is stored in the game terminal 200 or on a card belonging to the player, the game terminal 200 may also calculate the operation history information which reflects the past operation history information of the game terminal 200. In addition, if the operation tendency information is calculated based on the operation history information of the latest game, this calculation may be performed at the game terminal 200, and the calculated operation tendency information may be transmitted to the server 100.

Examples of the elements which form the predetermined actions and situations in a soccer game will be provided.
Examples of Predetermined Actions
  Short passing
  Through passing
  Centering
  Clearing
  Long passing
  Dribbling shot
  Direct shot
  Lob shot
  Sliding
  Heading
  Press
  Dash
  Shot cancel
  Putting the operation into action
  Keeper jumping out
  Feint
Examples of Situations
  Time . . . opening, middle, second half, and the like
  Area . . . own ground, enemy ground, center, side, and the like
  Game status . . . lead, tied score, behind, and the like
  Situation nearby . . . allies nearby, no allies nearby, enemies in the passing course, no enemies in the passing course, and the like
(2-2) Creating a Competitive Game Schedule When the competitive game schedule creation unit of the server 100 (corresponding to the competitive game schedule creation unit and the period set unit) receives an entry request for the league game from a game terminal 200 which has not joined the league game, it will create a new league schedule and an identifier for the league game (hereinafter referred to as the competitive game ID) to be stored in the data storing unit 105. The game terminal 200 is notified of the competitive game ID, and is written into the game data of the player data. FIG. 9 is the league schedule which has been newly created by the server 100. This figure shows the league schedule in a situation in which four players, A, B, C, and D, (shown as team A, team B . . . in FIG. 9) play the league game. The competitive game schedule creation unit creates the league schedule so that every player can play two games against the other three players respectively. In other words, it creates the league schedule so that every player can play a home game and an away game against the other players other than himself/herself. As a method for determining players to be allowed to join the league game, for example, a method is given in which a list of players requesting entry to the league game is created, and a predetermined number of players is selected from the list.

Figures 10A, 10B:
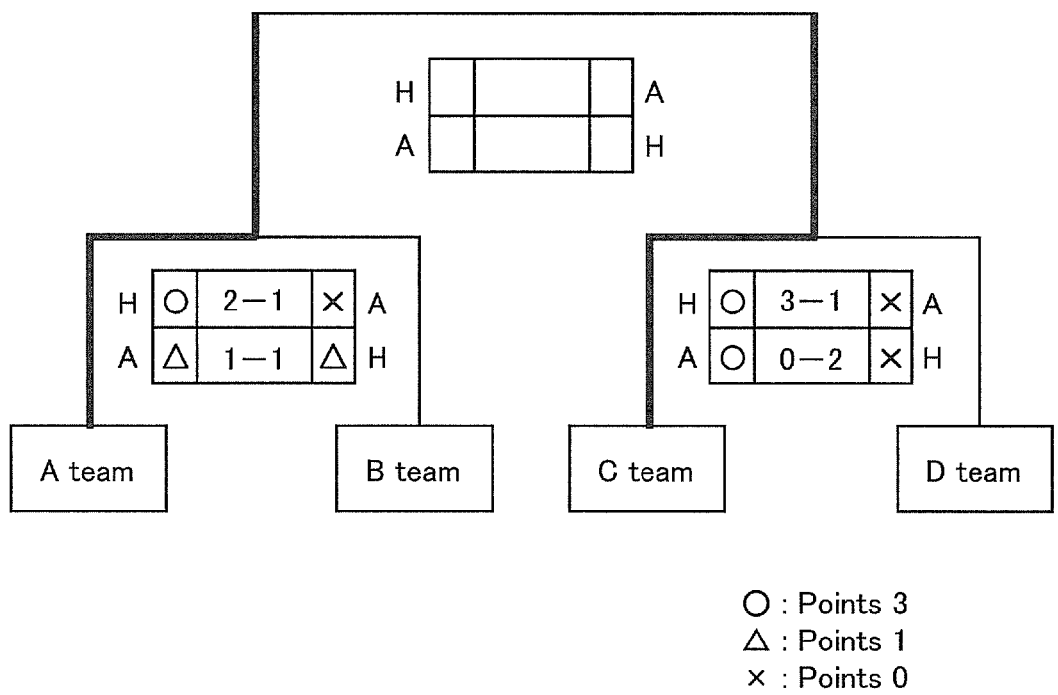
FIG. 10A is a conceptual explanatory diagram of a tournament schedule created by the server.
FIG. 10B is a conceptual explanatory diagram showing the way in which the game outcome is determined based on FIG. 10A.

A league game was used as an example, but the game schedule of a tournament game is created in the same way. FIG. 10A is a conceptual explanatory diagram of a tournament schedule created by the competitive game schedule creation unit. In the tournament game, the tournament schedule is created so as to determine the game outcome between two players based on the results of a home game and an away game that they play. The tournament game is identified by the competitive game ID. By creating the league schedule or tournament schedule, the competitive game played by three and more players and the determination of their rankings become possible.

Furthermore, when the competitive game schedule creation unit creates a competitive game schedule such as a league schedule and tournament schedule, it may set an expiration date for them. FIG. 11 shows a pending list to manage a competitive game in which the expiration date has not elapsed. The competitive game schedule creation unit registers in the pending list, for example, the created competitive game ID in association with its expiration date. The pending list is retained in the RAM 102, for example. By setting the expiration date, it is possible to determine ranking within the expiration date. In addition, it is possible to promote the participation of a player because the player will try to finish the predetermined game within the expiration date.

(2-3) Transmitting the Game Data

When the game data transmission unit of the server 100 receives the designation of opponent from the game terminal 200, it transmits the player data of the designated opponent to the requester. More specifically, the game data transmission unit receives the competitive game ID from the game terminal 200, and transmits the competitive game schedule which is identified by this ID. Then, the game data transmission unit receives from the game terminal 200 a designation of any of the competitive games which are defined in the competitive game schedule and have not been executed. The game data transmission unit specifies an opponent based on the received designation of the competitive game, reads out his/her player data from the data storing unit 105, and transmits it to the game terminal 200.

(2-4) Receiving the Results of a Competitive Game

The competitive game result receiving unit of the server 100 receives the result of the competitive game and the operation history information from the game terminal 200 which executed the game. For example, when a simulated competitive game between player A and player B is played at the game terminal 200a, the competitive game result receiving unit receives the result of the competitive game and the operation history information of the player A. When the game terminal 200 joins a league game or a tournament game, the competitive game result receiving unit updates a league schedule or a tournament schedule based on the result of the competitive game. In other words, whenever it receives each of the results of the competitive games in the competitive game schedule, it writes the result into the competitive game schedule.

In addition, the competitive game result receiving unit updates the operation tendency information of the player based on the operation history information. For example, if the operation tendency information is calculated based on the latest game, the competitive game result receiving unit calculates the selection rate of actions with respect to each situation based on the received operation history information, and stores it as the new operation tendency information in the data storing unit 105. Furthermore, the competitive game result receiving unit updates "level," "ranking," "team member data," and the like in the game data which is included in the player data based on the result of the competitive game.

(2-5) Determining the Game Outcome

The game outcome determination unit of the server 100 determines the ranking of the players based on the results of the completed games when all league games or all tournament games have been played, or the expiration date has expired. In addition, it deletes from the pending list the entry to the league game or tournament game in which the ranking has been determined.

In addition, the game outcome determination unit may create a website for posting the results of the league games or tournament games, set a time limit for the posted results, and register the URL of the website in a termination list. FIG. 12 is a conceptual explanatory diagram of the termination list created by the game outcome determination unit. The termination list stores the competitive game ID, the URL, and the posting time limit in association with one another. The termination list is retained in the RAM 102 of the server 100. Furthermore, the game outcome determination unit can notify the players of a game of the URL of the website in which the results of the competitive games are posted. Specifically, the game outcome determination unit extracts the player data, which includes the ID of the competitive game in which the ranking of the players in a game was determined, in the game data, and extracts the network addresses of these players therefrom. Then, it transmits a message for notifying the URL of the website posting the results of the competitive games to the extracted network addresses. Another alternative is to store a message template without the URL, and then complete the message by simply inserting the URL therein. By posting the results of competitive games on the website, the players that played the games can freely browse the results of the competitive games anytime. In addition, if a third party as well as these players can access the website in which the results are posted, these players will become conscious of any third party who is viewing the results of the competitive games. This increases the player's incentive to play the game within the expiration date, and to join a new league game or a new tournament game.

Furthermore, the way to determine the game outcome will be described in detail. FIG. 13 is a league schedule in the case where all competitive games in the league game are played within the expiration date. The game outcome determination unit counts each home game and away game as one game in order to compute the goal differential and the difference between the number of games won and lost, and determines ranking according to the order of the difference between the number of games won and lost. When the difference between the number of games won and lost between the players is the same, the ranking is determined based on the goal differential. When the goal differential is the same, the ranking is determined according to the total score.

FIG. 14 is an example of a league schedule in the case where all competitive games have not been completed within the expiration date. One way to determine the ranking in this case is to calculate the goal differential and the difference between the number of games won and lost of each player, regardless of the games which have not been played, and determine the rankings as described above.

In the case of a tournament game, the game outcome determination unit also determines ranking of the players entering the tournament game prior to the expiration date. For example, assume that the results of the games which have been played prior to the expiration date are shown in FIG. 10A. The game outcome determination unit computes the difference between the number of games won and lost and the goal differential of each player as shown in FIG. 10B, so that it can determine the ranking of the players A, B, C, and D based on the result of the computation.

(2-6) Promoting a Competitive Game

The competitive game promoting unit of the server 100 transmits an e-mail to players in order to prompt the execution of competitive games which have not been played. Specifically, the competitive game promoting unit monitors all of the expiration dates which are registered in the pending list, and extracts the competitive game ID of the league game which will expire, for example, in a week. In addition, it searches for player data which includes the extracted competitive game ID. Furthermore, the name and the network address of the player are extracted from the retrieved player data. Then, it transmits a previously stored message to the extracted e-mail address. This can prompt the players to join the game.

(3) Flow of Process in the Game System

Figure 15A:
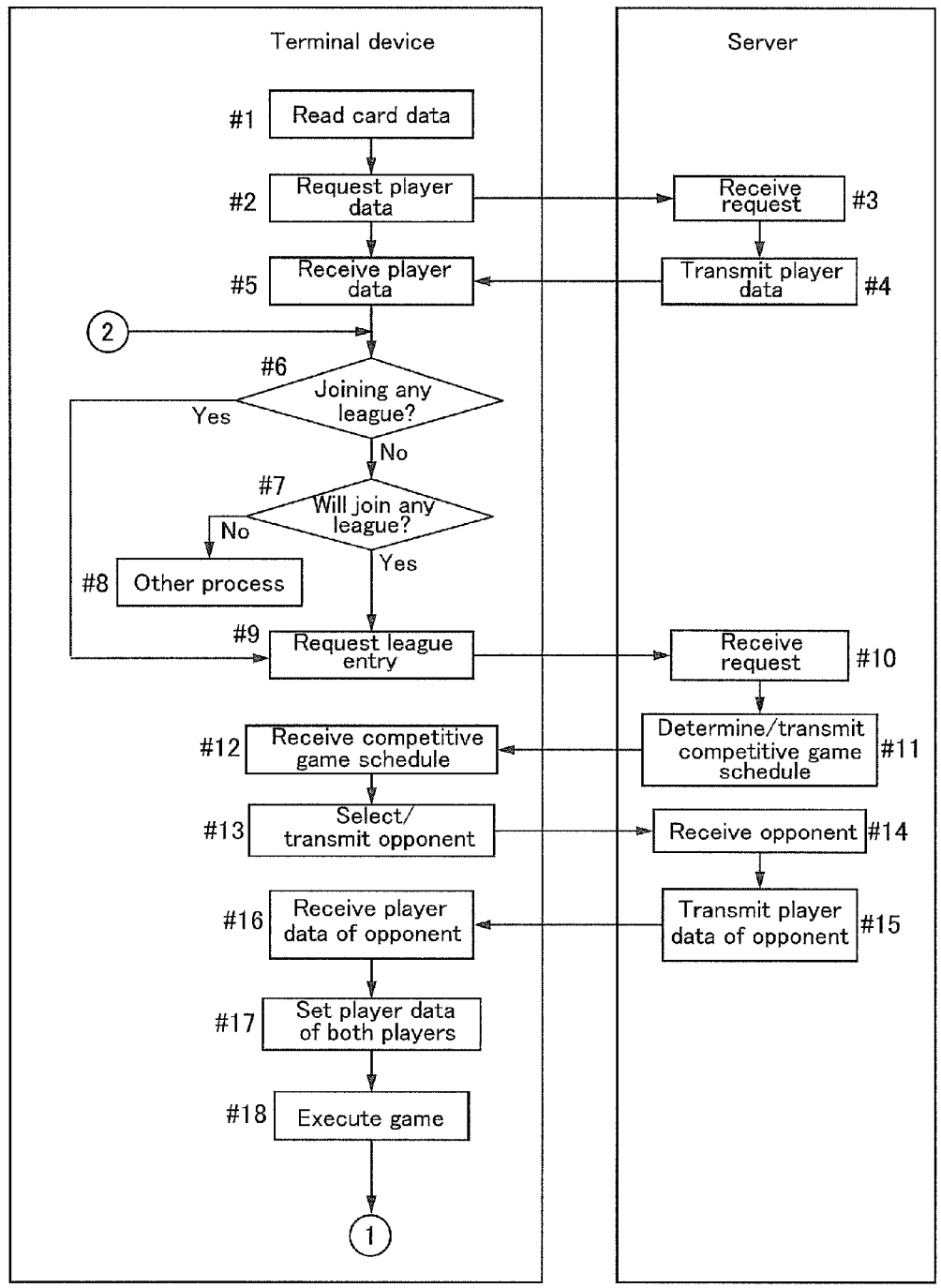
FIG. 15A is an example of the flow of a process performed by the game system in FIG. 1.
Figure 15B:
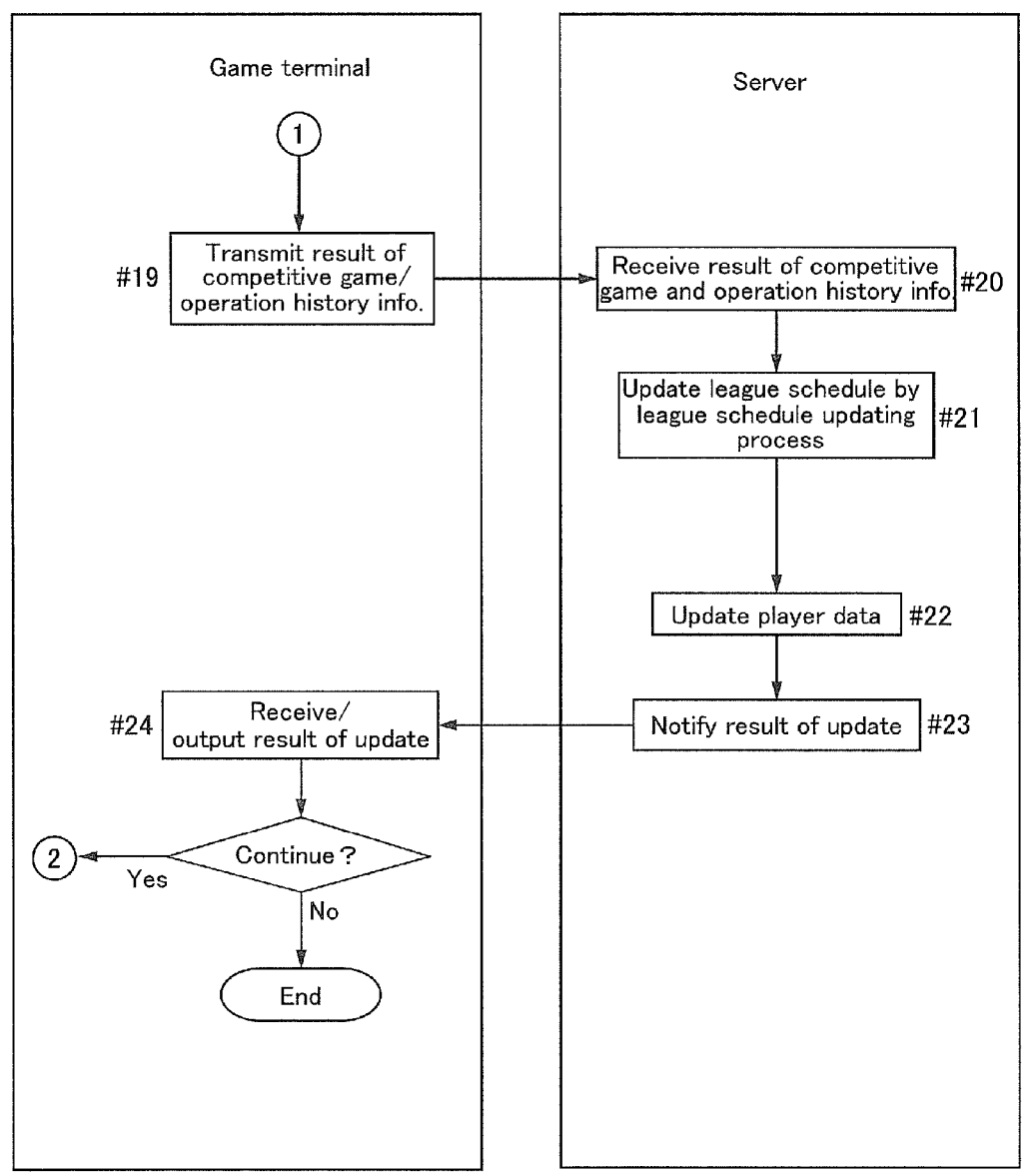
FIG. 15B is another example of the flow of a process performed by the game system in FIG. 1.

FIGS. 15A and 15B are examples showing the flow of a process in the game system according to the present embodiment. This process can be divided broadly into a process up to the execution of the game and a process of notifying the results of the competitive game after execution thereof.

(3-1) Game Execution

The game terminal 200 reads data from a card that has been inserted into the card reader/writer 212 (#1). When an IC card which can store large volumes of data is used as the card, it is possible to have a configuration in which the game data of the player is stored in the card, and that data is read when the game is started. Here, take as an example the case in which the game data is stored in the server 100, and only a player ID for identifying a player is stored in a magnetic card. When the game terminal 200 reads the player ID from the card, it requests the server 100 to transmit the player data based on the player ID (#2).

The server 100 extracts the appropriate player data from the data storing unit 105 based on the player ID, and transmits it to the requester (#3 and #4).

When the game terminal 200 receives the player data (#5), it determines whether or not the player is joining any of the league games or tournament games (#6). This determination is made based on whether or not the competitive game ID is included in the player data. When the competitive game ID is not included in the player data, the game terminal 200 inquires of the player whether or not he/she will newly join any of the league games or the tournament games (#7). If he/she will not newly join these games, it performs a process such as one in which the server 100 will be notified of a game terminal which is connected to the network 300, and start a competitive game against that game terminal (#8). When he/she has already joined or will newly join any of the league games or the like, the game terminal 200 transmits an entry request for the league game or tournament game to the server 100 (#9).

The server 100 receives the entry request (#10) and transmits a competitive game schedule (#11). At this point, if there exists a competitive game schedule which has been created, it will transmit that competitive game schedule. When the game terminal 200 newly joins a league game or the like, a new competitive game schedule is created and transmitted to the game terminal 200. When the new competitive game schedule is created, the server 100 sets an expiration date and registers it in the above-described pending list.

When the game terminal 200 receives the competitive game schedule from the server 100 (#12), it will accept a selection of an opponent from the player (#13). For example, the game terminal 200 outputs the league schedule shown in the above-described FIG. 9 on the screen, and accepts the selection of an opponent, which can be made by clicking on any of the blank spaces. Furthermore, the game terminal 200 notifies the selected opponent to the server 100 (#13).

When the server 100 receives the result of the selection of the opponent (#14), it reads out the player data of the opponent from the data storing unit 105, and transmits it to the game terminal 200 (#15).

When the game terminal 200 receives the player data of the opponent (#16), it will prepare to start the game based on the player data of the player who operates the game terminal 200 and the player data of the opponent (#17). Specifically, the game terminal 200 performs a process of determining the lineup (participating members), formation, strategy, the type of defense, and the like of the opposing team which the game terminal 200 itself will operate. In addition, the game terminal 200 accepts a team setting such as the lineup (participating members), formation, strategy, the type of defense, and the like determined by the game player, and performs a parameter setup based on the setting. After that, the game terminal 200 starts and executes the game based on the setting data (#18). After the game has been completed, the game terminal 200 transmits the result of the competitive game and the operation history information to the server 100 (#19).

(3-2) Notifying the Result of the Competitive Game

The server 100 receives the result of the competitive game and the operation history information (#20), and updates the player data and the competitive game schedule (#21 and #22). Specifically, the server 100 writes the result of the competitive game into the competitive game schedule, and determines the ranking of the participating players at that time (#21). In addition, the server 100 updates the game data and the operation tendency information in the player data (#22). When the operation tendency information is calculated based on the operation history information of the latest game, the server 100 calculates new operation tendency information based on the received operation history information, and replaces the old operation tendency information with it (#22). Then, the server 100 transmits the league schedule reflecting the result of the competitive game, a temporary ranking, the new player data, and the like to the game terminal 200 (#23).

The game terminal 200 notifies the player of the data received from the server 100 (#24). If the game is to be continued, the process returns to the above-described step (#6), in which the game terminal 200 determines whether or not the player is joining any of the league games. If the game is not to be continued, the process is ended.

(4) Process Executed by the Server

Figure 16:
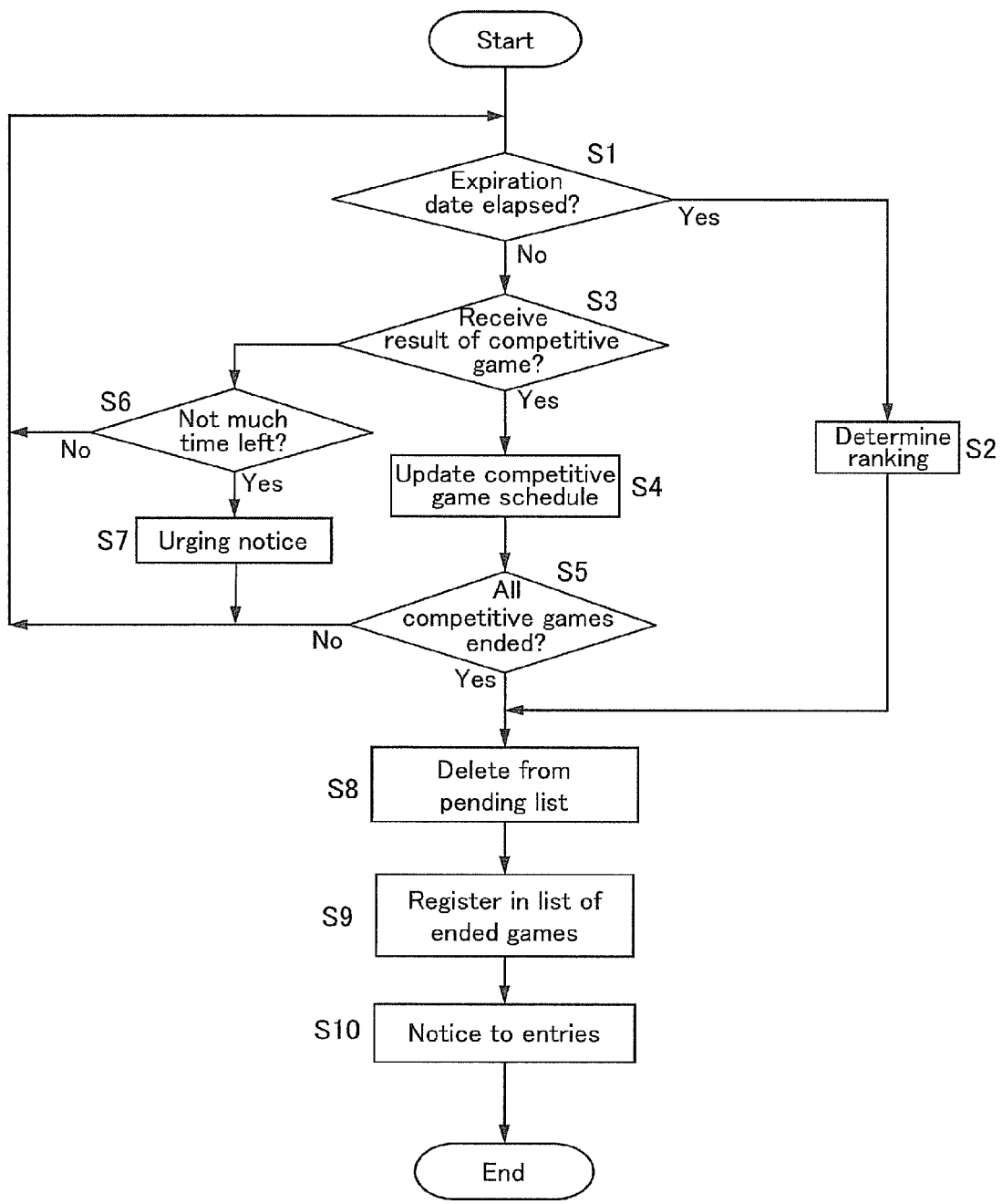
FIG. 16 is a flow chart showing an example of the flow of a competitive game updating process performed by the server.

FIG. 16 is a flow chart showing an example of the flow of the competitive game updating process performed by the server 100. In the above-described process, the server 100 has transmitted the competitive game schedule to the game terminal 200. The server 100 will perform the following process in order update the competitive game schedule. When the server 100 creates a new competitive game schedule, the following process starts independently with respect to each competitive game schedule. In order to simplify the explanation, a situation in which the league schedule of a competitive game ID "α" is created, and the following process will be performed based on the league schedule α.

Step S1: The server 100 determines whether or not the expiration date of the competitive game schedule α has elapsed. If the expiration date has elapsed, the process proceeds to step S2.

Step S2: The server 100 determines the final ranking of the players who participated in the league game based on the results of the played competitive games. As described above, even if all the competitive games have not been played, the server 100 will still determine the ranking of the participating players regardless of the unfinished games. The ranking in a soccer game may be determined based on points for example, and the way to determine the ranking is not particularly limited to any method.

Step S3: When the expiration date of the competitive game schedule α has not elapsed, the server 100 waits for the competitive result from the game terminal 200. When the server 100 receives it, the process proceeds to step S4.

Step S4: When the server 100 receives the game result from the game terminal 200, it updates the league schedule α. In other words, it writes the result into the league schedule α. Furthermore, the server 100 may calculate a temporary ranking at this time. Here, the updated league schedule α and/or the temporary ranking is/are transmitted to the terminal device 200 in the above-described process shown in FIG. 15B (the above-described #23).

Step S5: The server 100 will determine whether or not all competitive games have been finished based on the results of the competitive games which are newly added. When all competitive games have been finished, the process proceeds to step S8 (which will be described later). If there are competitive games that have not been completed, the process proceeds to step S1 and repeats the above-described processes.

Steps S6 and S7: If the server 100 has not received the result of the competitive game, it refers to the pending list shown in the above-described FIG. 11, and determines whether or not the remaining time before the expiration date is less than a predetermined time (S6). When the remaining time before the expiration date is less than one week, for example, the server 100 transmits a notification to the participating player in the league schedule α to prompt the player to play the competitive game (S7).

Step S8: When the server 100 determines the final ranking in the league schedule α in which the expiration date has elapsed or all of the competitive games have been completed, it deletes the entry of the league schedule α from the pending list.

Step S9: The server 100 creates the entry in the league schedule α in the termination list. Furthermore, the server 100 creates a website for posting the final result of the league schedule α, and registers the competitive game ID "α" together with the URL thereof and the time limit for posting them in the termination list.

Step S10: The server 100 notifies the participating players of the league game a of the URL in which the final result of the league game is posted and the posting time limit thereof, and ends the process.

In the embodiment of the present invention, the operation tendency information is created based on the number of selections of actions, which indicate the real actions of the player, and the game terminal 200 creates a simulated opposing team of the player using the operation tendency information. Therefore, a simulated competitive game between the players separated geographically becomes possible. Furthermore, the result of competitive game between two players is determined based on two games, one of which is a home game in which a player actually operates the game, and the other of which is an away game in which a CPU operates the game as a simulated player. Therefore, it is possible to determine the game outcome and ranking equally for each player, and determine the game outcome without a sense of inequality.

Other Embodiment

The present invention includes programs for executing the above-described method on computers, and computer readable recording media in which such a program is recorded. The recording media may include computer readable/writable flexible discs, hard discs, semiconductor memories, CD-ROM, DVD, magneto-optical discs (MO), and the like.

The present invention is applicable to all competitive games played by a plurality of players such as a sports game, fighting game, horse racing game, mah-jongg game, and go game.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A competitive game result management system comprising a first game device operated by a first player, a second game device operated by a second player, and a competitive game result management device configured to manage the result of a competitive game played by the first and the second players, the first game device comprising:
a first obtaining unit configured to obtain game data of the second player from the competitive game result management device; and
a first simulated competitive game unit configured to play a first simulated competitive game against the first player, the first simulated competitive game unit including a simulated second player based on the game data obtained by the first obtaining unit;

the second game device comprising:
a second obtaining unit configured to obtain game data of the first player from the competitive game result management device; and
a second simulated competitive game unit configured to play a second simulated competitive game against the second player, the second simulated competitive game unit including a simulated first player based on the game data obtained by the second obtaining unit; and the competitive game result management device comprising:
a player information storing unit configured to store the game data of the first and the second players;
a first game data transmission unit configured to transmit the game data of the second player stored in the player information storing unit to the first game device operated by the first player;
a second game data transmission unit configured to transmit the game data of the first player stored in the player information storing unit to the second game device operated by the second player;
a first competitive game result receiving unit configured to receive the result of the first simulated competitive game from the first game device;
a second competitive game result receiving unit configured to receive the result of the second simulated competitive game from the second game device; and
a game outcome determination unit configured to determine the outcome between the first and the second players based on both the result of the first simulated competitive game received by the first competitive game result receiving unit and the result of the second simulated competitive game received by the second competitive game result receiving unit, such that the outcome of the first simulated competitive game is tabulated as a home game for the first player and an away game for the second player and the outcome of the second simulated competitive game is tabulated as a home game for the second player and an away game for the first player.

2. The competitive game result management system according to claim 1, wherein the game data stored in the player information storing unit comprises an identifier that identifies each of the plurality of game characters operated by each player.

3. The competitive game result management system according to claim 1, wherein the game data stored in the player information storing unit comprises operation history information of each player who is playing the game.

4. The competitive game result management system according to claim 1, further comprising at least one game device operated by a third player in addition to the first and the second game devices, wherein the competitive game result management device further comprises a competitive game schedule creation unit configured to create a competitive game schedule for a combination of three or more players.

5. The competitive game result management system according to claim 1, wherein the game outcome determination unit is configured to set a predetermined period within which the outcome of a game between the first and the second players is determined, and if the game outcome determination unit does not receive the result of the first simulated competitive game or the result of the second simulated competitive game within the predetermined period, the game outcome determination unit will determine the game outcome based on one of either of the results of the simulated competitive games.

6. The competitive game result management system according to claim 1, wherein the game outcome determination unit is configured to set a predetermined period within which the outcome of the game between the first and the second players is determined, and the competitive game result management system further comprises a competitive game promoting unit configured to promote the execution of a simulated competitive game by transmitting a competitive game promoting notification to the first and/or the second game device before the predetermined period expires.

7. The competitive game result management system according to claim 1, wherein
the game outcome determination unit is configured to determine the outcome between a third player and a fourth player with the third player playing a third simulated competitive game unit including a simulated fourth player such that game results are tabulated as a home game for the third player and an away game for the fourth player, and
the fourth player playing a fourth simulated competitive game including a simulated third player such that game results are tabulated as a home game for the fourth player and an away game for the third player.

8. The competitive game result management system according to claim 1, wherein
the competitive game result management device further comprises a competitive game schedule creation unit configured to create a competitive game schedule for a combination of four players where the competitive game schedule includes simulated competitive games where the first player plays, one by one, simulated tournament opponents that include the second player, the third player and the fourth player such that the outcome of each game played by the first player is tabulated as a home game for the first player and an away game for a corresponding one of the simulated tournament opponents, and similarly, each game played by the second player against the simulated tournament opponents is tabulated as a home game for the second player and an away game for a corresponding one of the simulated tournament opponents.

9. The competitive game result management system according to claim 4, wherein the competitive game schedule created by the competitive game schedule creation unit defines a round robin league competition of the selected players.

10. The competitive game result management system according to claim 4, wherein the competitive game schedule created by the competitive game schedule creation unit defines a tournament competition of the selected players.

11. A competitive game result management program recorded on a non-transitory computer-readable storage medium that will cause a computer to act as a competitive game result management device in a competitive game result management system comprising a first game device operated by a first player, a second game device operated by a second player, and a competitive game result management device configured to manage the results of competitive games played by the first and the second players,
the first game device comprising:
a first obtaining unit configured to obtain game data of the second player from the competitive game result management device; and
a first simulated competitive game unit configured to play a first simulated competitive game against the first player such that the first player plays against a simulated second player based on game data obtained by the first obtaining unit;
the second game device comprising:
a second obtaining unit configured to obtain game data of the first player from the competitive game result management device; and
a second simulated competitive game unit configured to play a second simulated competitive game against the second player such that the second player plays against a simulated first player based on the game data obtained by the second obtaining unit;
the competitive game result management program causing the computer to function as: a player information storing unit configured to store the game data of the first and the second players;
a first game data transmission unit configured to transmit the game data of the second player stored in the player information storing unit to the first game device operated by the first player;
a second game data transmission unit configured to transmit the game data of the first player stored in the player information storing unit to the second game device operated by the second player;
a first competitive game result receiving unit configured to receive the result of the first simulated competitive game from the first game device;
a second competitive game result receiving unit configured to receive the result of the second simulated competitive game from the second game device; and
a game outcome determination unit configured to determine the outcome of a game between the first and the second players based on both the result of the first simulated competitive game received by the first competitive game result receiving unit and the result of the second simulated competitive game received by the second competitive game result receiving unit, such that the outcome of the first simulated competitive game is tabulated as a home game for the first player and an away game for the second player and the outcome of the second simulated competitive game is tabulated as a home game for the second player and an away game for the first player.

12. A competitive game result management method executed by a competitive game management system comprising a first game device operated by a first player, a second game device operated by a second player, and a competitive game result management device configured to manage the results of competitive games played by the first and the second players,
the first game device executing the steps of:
obtaining game data of the second player from the competitive game result management device; and
playing a first simulated competitive game against the first player such that the first player plays against a simulated second player based on the game data of the second player, the second game device executing the steps of:
obtaining game data of the first player from the competitive game result management device; and
playing a second simulated competitive game against the second player such that the second player plays against a simulated first player based on the game data of the first player;
the competitive game result management device executing the steps of:
storing the game data of the first player and the game data of the second player;
transmitting the game data of the second player stored in the player information storing unit to the first game device operated by the first player;
transmitting the game data of the first player stored in the player information storing unit to the second game device operated by the second player;
receiving the result of the first simulated competitive game from the first game device;
receiving the result of the second simulated competitive game from the second game device; and
determining the outcome of a game between the first and the second players based on both the result of the first simulated competitive game received by the first competitive game result receiving unit and the result of the second simulated competitive game received by the second competitive game result receiving unit, such that the outcome of the first simulated competitive game is tabulated as a home game for the first player and an away game for the second player and the outcome of the second simulated competitive game is tabulated as a home game for the second player and an away game for the first player.

13. The competitive game result management program according to claim 11, further comprising
a competitive game schedule creation unit configured to create a competitive game schedule for a combination of four players where the competitive game schedule includes simulated competitive games where the first player plays, one by one, simulated tournament opponents that include simulations of the second player, the third player and the fourth player such that the outcome of each game played by the first player is tabulated as a home game for the first player and an away game for a corresponding one of the simulated tournament opponents, and similarly, each game played by the second player against simulated tournament opponents is tabulated as a home game for the second player and an away game for a corresponding one of the simulated tournament opponents.

14. The competitive game result management method according to claim 12, further comprising
creating a competitive game schedule for a combination of four players where the competitive game schedule includes simulated competitive games where the first player plays, one by one, simulated tournament opponents that include the second player, the third player and the fourth player such that the outcome of each game played by the first player against the simulated tournament opponents is tabulated as a home game for the first player and an away game for a corresponding one of the simulated tournament opponents, and similarly, each game played by the second player against the simulated tournament opponents is tabulated as a home game for the second player and an away game for a corresponding one of the simulated tournament opponents.

* * * * *